June 14, 1960

T. E. DUGLE 2,941,117

MECHANICALLY STEERABLE AND ELECTRONICALLY
AUTOMATIC HEADLIGHTING SYSTEM

Filed Oct. 27, 1959

*INVENTOR.*
THOMAS E. DUGLE.
BY
Charles M. Hogan
ATTORNEY.

June 14, 1960

T. E. DUGLE 2,941,117

MECHANICALLY STEERABLE AND ELECTRONICALLY
AUTOMATIC HEADLIGHTING SYSTEM

Filed Oct. 27, 1959

INVENTOR.
THOMAS E. DUGLE
BY *Charles M. Hogan*

ATTORNEY.

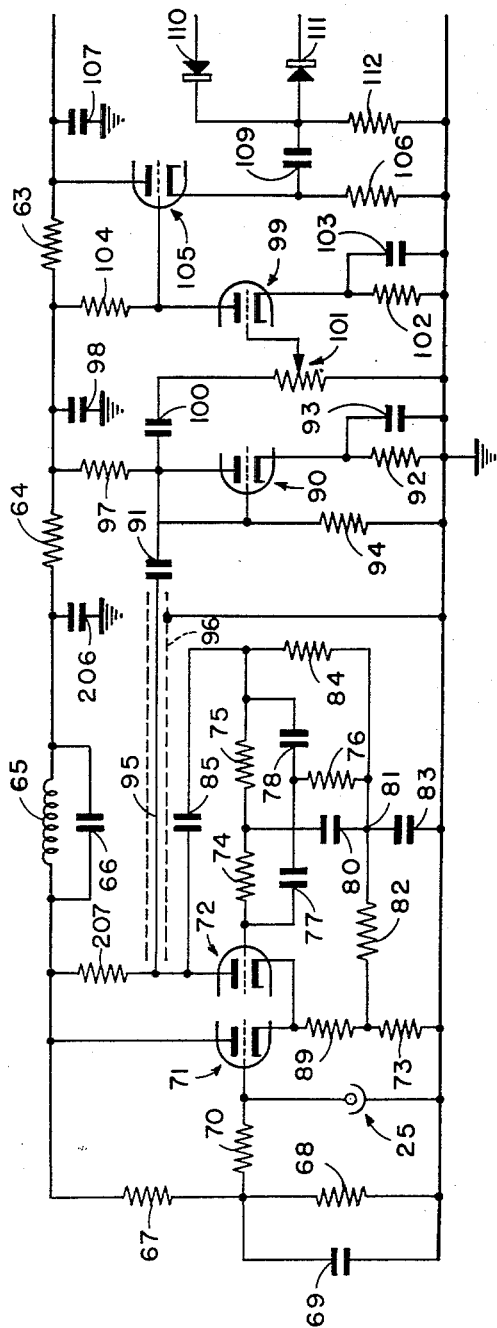

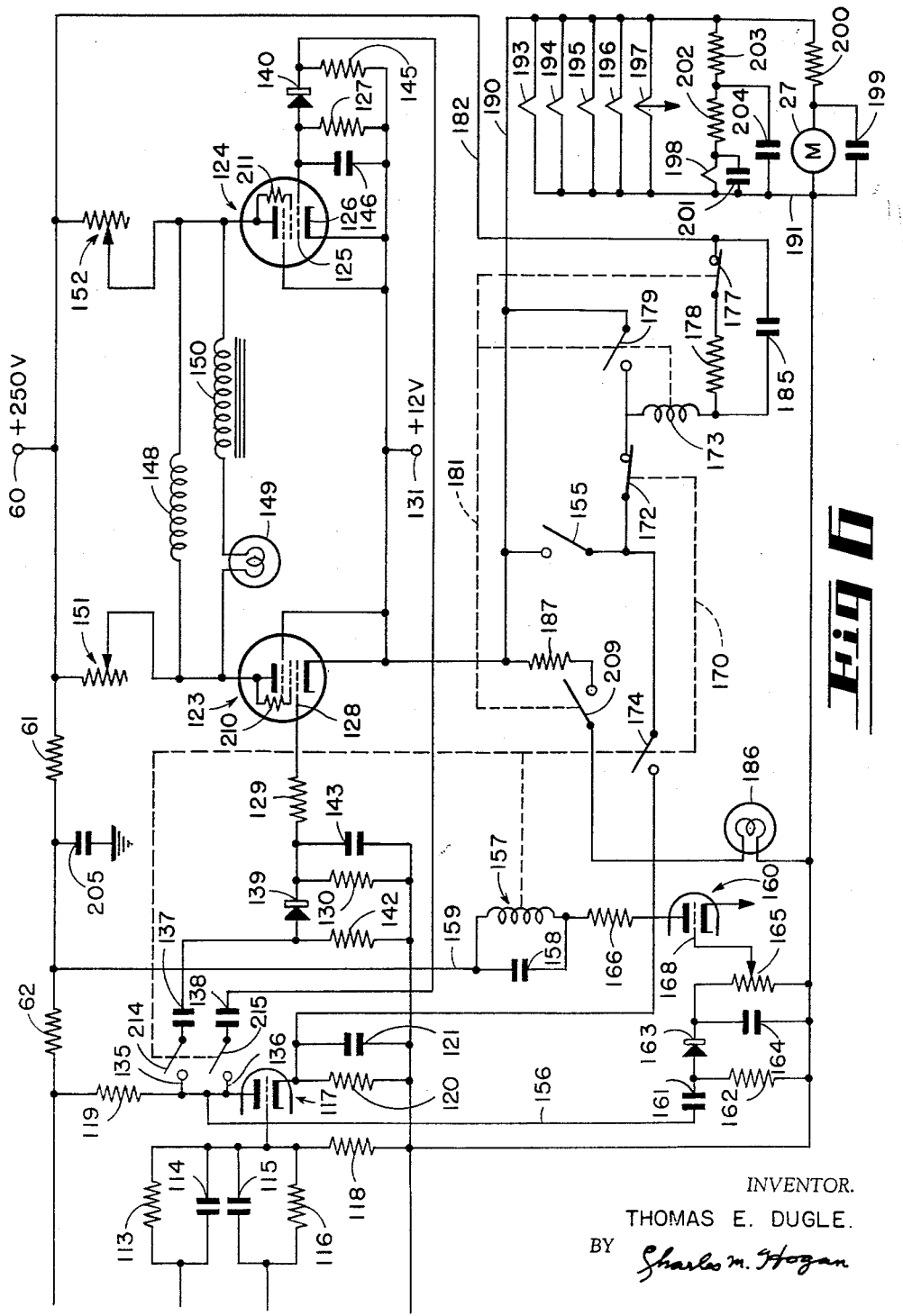

United States Patent Office 2,941,117
Patented June 14, 1960

2,941,117

MECHANICALLY STEERABLE AND ELECTRONICALLY AUTOMATIC HEADLIGHTING SYSTEM

Thomas E. Dugle, Cincinnati, Ohio, assignor, by mesne assignments, to J. Page Hayden, Cincinnati, Ohio Filed Oct. 27, 1959, Ser. No. 849,022

11 Claims. (Cl. 315—81)

The present invention relates to headlight control systems generally and specifically to improvements in the basic Bone type of control system illustrated in United States Patents Nos. 2,562,258 and 2,753,487, issued to Evan P. Bone and assigned to J. Page Hayden, of Cincinnati, Ohio.

The Bone headlight control system is an electrical and optical installation in an automobile (i.e. equipped vehicle) which so functions that a non-glare shadow automatically is cast on the zone of an oncoming vehicle, as the passing approach is made, in order to protect its operator from disability and discomfort glare. The Bone system functions in such a way that light of such intensity as to effect greatly improved night visibility for the driver of the equipped vehicle is projected onto the right side of the road in front of the equipped vehicle throughout the approach. As the approaching vehicles finish passing each other the light is projected down the road centrally.

The system is premised generally on a direction finder including photoelectric means for detecting the presence of an oncoming vehicle, in combination with a direction-finder vane which is positioned in azimuth, under the ultimate control of the photoelectric means, to sense the direction of approach of the oncoming vehicle (specifically, the relative bearing of the left or inner headlamp of the approaching vehicle, "inner" meaning closer to the center line of the highway.) Synchronized with the direction-finder vane are vanes in the head lamps which function in such a way as to define the projection of light and to cause overlapping shadows or non-glare areas to track the approaching vehicle until it passes or comes alongside the equipped car, all as described in detail in the aforementioned Bone patents.

Improved systems of this character are described in the following United States patent applications, assigned to the same assignee as the present application and invention, and reference is made to such applications for a detailed description of such improvements, both as to structure and mode of operation:

Richard H. Engelmann (hereinafter referred to as Engelmann I), S.N. 715,973
Richard H. Engelmann and Frank M. Foster, S.N. 715,875 both filed in the United States Patent Office on February 18, 1958. These patent applications issued as U.S. Patents Nos. 2,917,663 and 2,917,666, respectively, on December 15, 1959.

The headlight control system in the aforementioned patent applications features synchronized shutters or vanes in the direction-finder and headlamps, each vane being angularly positioned or driven by electromagnetic means such as a galvanometer. The several independent galvanometers or electromagnetic means are electrically synchronized. Reference is made particularly to Engelmann I for a detailed description of electrical circuitry by which synchronism of the independent galvanometers or electromagnetic means or actuators is accomplished.

The present invention is directed to the principal objective of providing a greatly simplified means and method for accomplishing this synchronism. In accordance with the present invention, the headlamp vanes and the direction finder vane are mechanically synchronized by being mounted on a shaft driven by a common actuator.

Another primary object of the present invention is to provide an automatic Bone-type headlight system which is positionally steered or mechanically assisted, as it were. In automatic headlight systems of the type heretofore devised, the direction-finder and headlamp cases are rigidly mounted with respect to the vehicle on which they are installed, and this gives rise to an occasional problem illustrated in the following manner: Let us suppose that an automobile equipped in accordance with the aforementioned patents or patent applications is approaching a right curve, and that an oncoming automobile is approaching the same curve. In that event, there is a tendency for the light shadow to be cast so far to the right with respect to the equipped car that the zone of light on the right side of the road is too narrow. It would be desirable to cast a sufficiently wide light zone across the chord of the curve, and this is accomplished in accordance with the present invention by mechanically steering the headlight casing. On both right and left turns the invention casts more light on the road than is the case with systems which are not steered.

Another difficulty which has arisen with automatic headlight control systems is their tendency to pick up on street lights and other extraneous point light sources. Most efforts to solve this problem have been directed to restriction of the field of vision of the photosensitive element which senses the presence of a light source, such as an oncoming head lamp, but it is desirable to solve that problem without unduly restricting the field of vision, and the present invention accomplishes this objective.

In accordance with the invention there is provided an automatic headlight control system including a direction-finding vane and optical means for defining a field of vision, in which the orientation of the optical means is coordinated with the steering of the motor vehicle. In the preferred embodiment of the invention herein shown, the orientation of the supporting framework for both the direction-finder and the head lamps is mechanically coordinated with the steering of the motor vehicle. This is accomplished by providing a mechanism, between the supporting framework of the headlamp system and the steering system of the equipped motor vehicle, which operates in such a way that when the vehicle executes a corner turn to the right the supporting framework is rotated approximately nine degrees to the right, for example. Similarly, when the vehicle executes a corner turn to the left, the supporting framework is turned approximately nine degrees to the left, for example.

It has been found that a total capability of eighteen degrees of rotation of the supporting framework is satisfactory to accomplish discrimination against undesired extraneous point sources of light. This mechanism includes terminal lost-motion expedients operable at the beginning and end of the steering operation so that the wheels are turned through a small angle before the supporting framework is turned and so that, after the supporting framework completes its limited angular motion, the steering movement of the wheels continues.

For a better understanding of the present invention, together with other and further objects, advantages and capabilities thereof, reference is made to the following description of the accompanying drawings, in which:

Figs. 5 and 6 are circuit diagrams which in composite illustrate complete electronic circuitry suitable for driving the Figs. 3-4 shaft and vanes.

The circuitry in Figs. 5 and 6 is the claimed subject matter of the co-pending patent application of Richard H. Engelmann, filed contemporaneously herewith, Serial No. 849,090, assigned to the same assignee as the present invention, and entitled "Improved Vane Actuating Circuitry for Automatic Headlighting System" (hereinafter referred to as Engelmann II).

Figure 1:
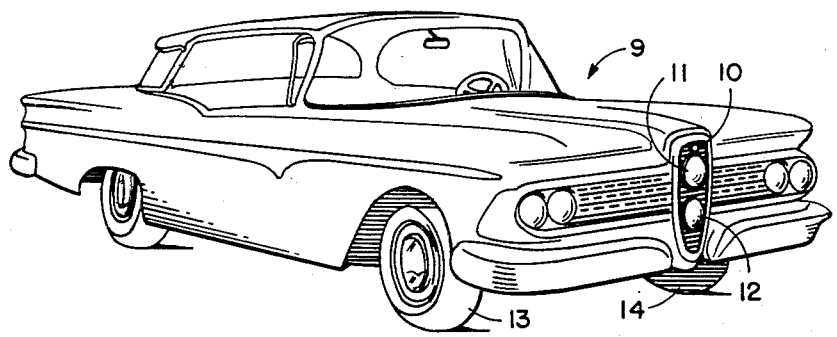
Fig. 1 is a perspective view of an automobile in which there is installed an improved headlight system in accordance with the invention.
Figure 2:
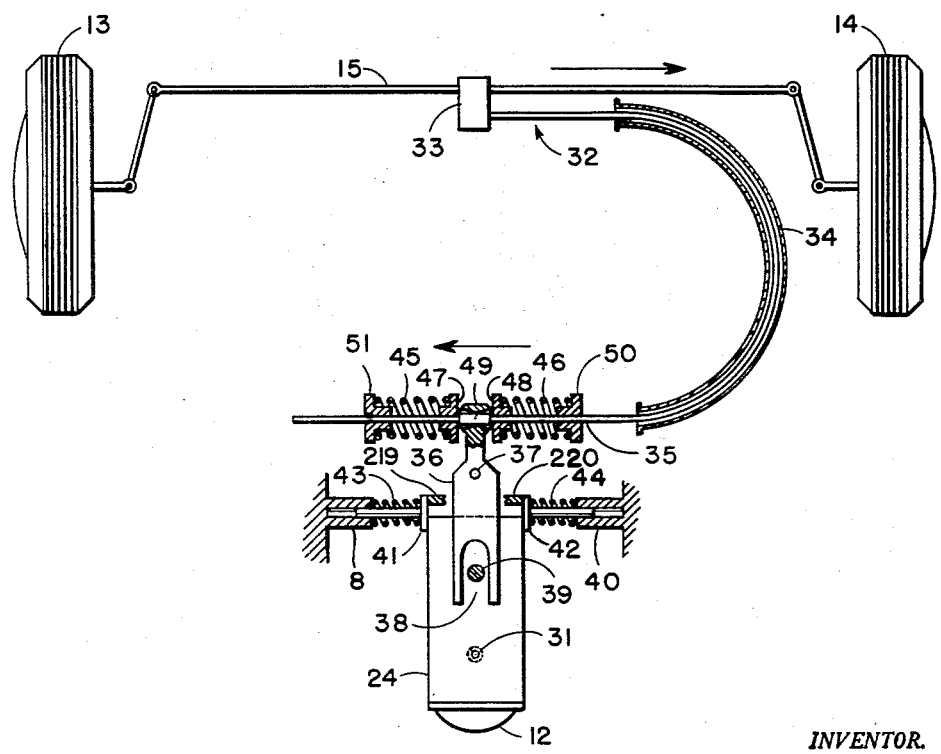
Fig. 2 is a schematic outline view of a suitable mechanism for coordinating the movements of the steering linkage of the automobile and the supporting framework for the automatic headlight control system.

In Fig. 1 there is shown in perspective an automobile generally indicated by the reference numeral 9. In the frontal portion of the hood of this automobile is installed a headlight system in accordance with my invention, including a direction finder lens 10 and headlight lenses 11 and 12, vertically aligned with the direction finder lens 10 on top. This vehicle has conventional steerable front wheels 13 and 14 and the wheels are angularly positioned for turning of the vehicle by a conventional linkage indicated by the reference numeral 15, as shown in Fig. 2.

Figure 3:
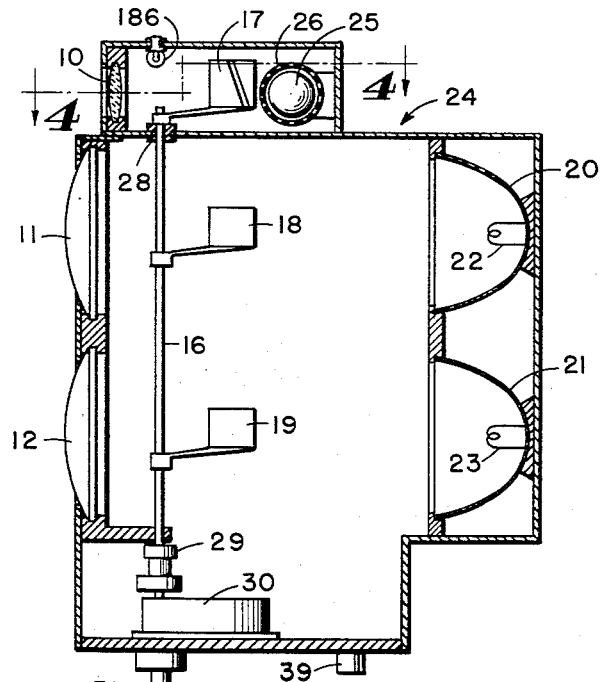
Fig. 3 is a sectional view as taken on line 3—3 of Fig. 4, looking in the direction of the arrows, showing my improved combination of direction finder, head lamps, mechanical synchronizing means.
Figure 4:
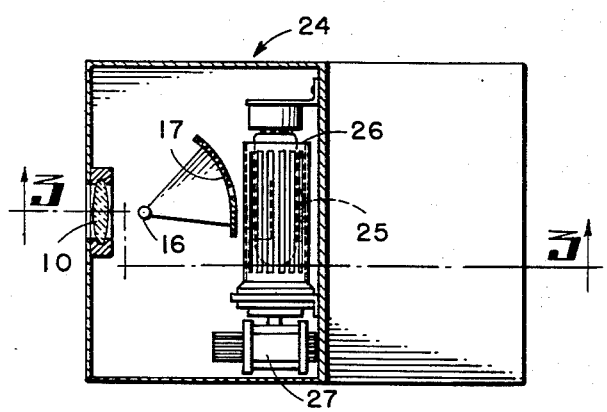
Fig. 4 is a sectional view taken on line 4—4 of Fig. 3, and looking in the direction of the arrows.

Referring now to Figs. 3 and 4, the invention provides a mechanical ganging means or shaft 16 to which are secured, for synchronized rotation therewith, the direction finder vane 17 and the head lamp vanes 18 and 19 (Fig. 3). The lenses 10, 11, and 12 and the head lamp reflectors 20 and 21, each including a filament 22 or 23, are suitably positioned and mounted in a casing generally indicated by the reference numeral 24, and this casing constitutes the supporting framework of the system. The supporting framework 24 is mechanically turned and coordinated with the steering linkage 15 through the linkage illustrated in Fig. 2. It will be understood that, in operation, the direction finder vane 17 senses the bearing of and follows or tracks an oncoming vehicle and the synchronized head lamp vanes 18 and 19 cast overlapping Bone-type non-glare shadows on the zone of such oncoming car, while allowing greatly enhanced lighting on the right side of and down the road, so far as the driver of the equipped vehicle is concerned. When the motor vehicle executes a large angle turning movement, then, in accordance with the invention, the supporting framework 24 is mechanically turned in the direction of such movement but to a lesser angular degree.

In Figs. 3 and 4 there is shown a phototube 25 which receives radiant energy from point light sources, as for example, the inner head lamp of an oncoming vehicle. Such radiant energy is in the form of pulses of light, the phototube 25 of the present application corresponding to phototube 13 shown in the United States patent of Harold J. Behm and William Hecox, No. 2,878,396, issued March 17, 1959, entitled "Direction Finder for Automobile Headlighting System" and assigned to the same assignee as the present application and invention. In accordance with the Behm and Hecox patent, there is concentrically mounted for rotation about the phototube a discriminator cylinder 26, driven by a motor 27. This cylinder is formed with alternate light-admitting and light-rejecting portions in such a way that it, in combination with phototube 25, discriminates against large areas of light and foreground light and causes the system to respond only to point sources of light in the optical field of direction finder lens 10. Reference is made to the Behm and Hecox patent for a complete description of the mode and manner in which such discrimination is accomplished. The details of the direction finder vane 17 are shown in Bone Patent 2,753,487.

Shaft 16 is provided with suitable bearings 28 and 29, and is mechanically coupled to the output shaft of electromagnetic means or motor 30, secured to casing 24. Means 30 is essentially a D.C. motor with a permanent magnet field and an armature winding 148. Angular movement of the armature is limited by stops 60 degrees apart.

The entire supporting framework or mounting 24 is rigidly secured to, for rotation with, a shaft 31, and this rotation is controlled by the steering linkage 15 through the mechanism illustrated in Fig. 2. Fig. 2 shows element 24 symbolically.

Referring now to Fig. 2, there is shown the shaft 31 which is rotatably journaled on the frame of the car in such a way that casing 24 is mounted for controlled angular motion relative to said frame. A push-pull control cable 32 is connected by block 33 to the linkage 15 and given a reverse bend by threading it through rigid tubing 34 in such a way that its end 35 moves linearly to the left as the car executes a right turn, and conversely. A right turn will be assumed in this discussion. Push-pull control cable 32 exerts a turning movement relative to a link 36 which is pivoted at 37 on the framework of the vehicle. Link 36 is formed with bifurcations to provide a lost motion clearance opening 38 so that linkage 36 is actuated to go through a small counterclockwise movement before one of the bifurcations abuts against projection 39 on casing 24 and causes the casing 24 to turn clockwise, in coordination with the aforementioned right turn.

The bifurcations are symmetrically spaced from the projection 39, formed on casing 24, so that the same lost motion occurs through the first phase of a left turning movement of the vehicle wheels. The steering linkage 15 can continue to be actuated after the angular motion of the casing 24 has ceased. To this end, there are associated with the casing limit stops 8 and 40, each provided with spring biased plungers 41 and 42, respectively, the springs being shown at 43 and 44. When the heads of the plungers abut against their respective limit stops, the angular motion of the casing 24 ceases but the motion of the cable continues. To provide for this operation, cable 32 does not drive link 36 directly but this drive is accomplished through over-travel yield springs 45 and 46, which bias bushings or followers 47 and 48 respectively, against a cylindrically formed section 49 of link 36. The two bushings and the cylindrical portion are secured in slidable relationship to the straight or shaft portion of flexible cable 32, to the left of point 35. Rigidly secured to the shaft portion of the cable are thrust elements 50 and 51 which impart through the bias springs 46 and 45 respectively, to the bushings 48 and 47, respectively, a linear thrust and cause link 36 to turn. That section of the shaft portion of cable 32 which slides immediately within section 49 is enlarged to provide thrust shoulders for the bushings, in such a way that springs 46 and 47 can be preloaded to provide positive action of element 49. But after the turning motion of the link 36 has ceased, due to the abutment of elements 42 or 41 against the limit stops 40 or 8, respectively, the compression of springs 46 and 45, respectively, permits continued motion of the cable 32.

The steering and headlamp linkages may be so proportioned that, after the lost motion has been taken up, the rate of angular motion of the headlamp and direction finder supporting framework may be greater or lesser than or equal to that of the front wheels.

The lengths of the springs 46 and 45 and the spacing between the elements 50 and 48 and the elements 47 and 51 are such as to permit complete freedom of operation of the steering mechanism for the wheels 13 and 14.

While the first lost motion connection herein described is accomplished by clearance and the second lost motion is accomplished by over-travel yield springs, it will be understood by those skilled in the art that many lost-motion and over-travel expedients are per se well known and these illustrative expedients are not intended as limiting the true scope of the invention. Further, the cable drive here shown is only one of many equivalent devices for steering the headlamps and is illustrative and not limiting. It will also be understood that while a steering range of 18 degrees is satisfactory, the angles used are not limiting nor do they need to be equal to right or left.

The lost motion clearance illustrated at 38 allows the driving wheels to move from road shock without disturbing the operation of the automatic headlamp control system. It will be understood that the springs 46 and 45 are sufficiently strong to override the springs 44 and 43. Stops 219 and 220 limit movement of plungers 41 and 42 towards each other to center casing 24. These stops are fixed to the frame of the car.

It will be understood that in some foreign countries in which cars drive on the left side of the road the directional aspects of the invention should be reversed so that the light should be cast on the left side of the road instead of the right.

The description now proceeds to the electrical circuitry. Reference is made to the aforementioned Behm and Hecox patent for a detailed description of the preferred means and mode of energization of phototube 25 (Fig. 5). The invention of the present application is of course not limited to utility with the Behm and Hecox direction finder but the latter is considered particularly advantageous.

Reference is made to the co-pending patent application of Richard H. Engelmann, filed contemporaneously herewith, Serial No. 849,090, assigned to the same assignee as the present invention, for a detailed description of the electric circuitry illustrated in Figs. 5 and 6. Said patent application is hereby incorporated herein by reference in so far as the description of that circuitry in Fig. 5 is concerned. The circuitry in Fig. 5 consists generally of a phototube stage including phototube 25, and the following stages in cascade therewith: A first amplifier including triode 71, a second amplifier including triode 72, a parallel T network, a third amplifier stage including tube 90, a fourth amplifier stage including tube 99, and a time dependent non-linear compensating network including diodes 110 and 111. This network also includes the elements designated 113—116 in Fig. 6. In Fig. 6 there is shown a further amplifier stage including tube 117, the rectifiers 139 and 140, and the output tubes 123 and 124. These stages and networks of Figs. 5 and 6 and their operation are fully described in said Engelmann patent application, Serial No. 849,090.

Let us now consider the operation of the Figs. 5-6 system:

When the system is turned on and the power supply connected thereto, the circuitry automatically operates to place the direction finder vane 17 in the counterclockwise position. This is the position in which the headlamp vanes cast no shadow down the road.

Output tubes 123 and 124 (Type 12BK5) have their anodes connected in opposition to the coil 148, current in which drives the vane shaft actuator or motor 30. Coil 148 is the armature winding of motor or galvanometer 30.

Tube 124 is arranged to be normally conductive when the power is turned on. During automatic operation or tracking an increment of current in tube 124 tends to cause the vanes to be driven counterclockwise. It will be seen from the foregoing that as the output from amplifier stage 117 causes greater positive voltages to be produced across resistor 130, and greater negative voltages to be produced across resistor 127, tube 123 will become more conductive and tube 124 less conductive so that the supplemental and cooperative effect of both output tubes is to drive the vanes clockwise. Conversely, as the output signal from amplifier stage 117 decreases in intensity, the positive voltage across resistor 130 and the negative voltage across resistor 127 decrease so that then the concurrent and cooperative operation of both output tubes drives the vanes in the counterclockwise direction.

The over-all operation of the system will be apparent in the light of the above description. When the head lights of an approaching car are in the direction finder's field of view, the image of this car's inner headlight is formed by the lens 10 (Figs. 3 and 4). This image is appropriately focused. When the light from this image falls on the phototube 25, the electrical system drives the vanes clockwise toward the spot of light. As soon as the finder vane 17 reaches the light spot, it cuts off light to the phototube 25. The amplifying system now drives the vanes counterclockwise but before the vanes have moved any appreciable distance the phototube 25 again receives light. This reverses the direction of the drive on the vane. The result is that the direction finder vane very slightly oscillates at a fairly high rate, about the position of the image of an approaching headlight. Thus, the direction finder vane position is an indication of the angular position or relative bearing of the headlight of an approaching car. That is, the direction finder senses the relative bearing of such headlight.

The headlight shadow-casting vanes 18 and 19 cast the non-glare shadows with proper angularity, by reason of the synchronism accomplished by their being mounted on the same shaft 16.

In order to perform the above described operation of tubes 123 and 124, two outputs are taken from amplifier stage 117 at 135 and 136, and are individually coupled as by coupling capacitors 137 and 138 (each 0.01 microfarad) to the rectifier networks inclusive of diodes 139 and 140 respectively (each type 1N1763). Referring to rectifier 139, its anode is connected to ground via a resistor 142 (100,000 ohms) and its cathode is connected to ground via resistor 130 (1 megohm) and shunt filter capacitor 143 (0.002 microfarad), to the end that unidirectional voltages of positive polarity are applied to the grid 128 of output tube 123 through series resistor 129.

Referring now to rectifier 140, its cathode is connected to cathode 126 via resistance 145 (100,000 ohms) and its anode is connected to the same point by rectifier load resistance 127 (1 megohm), shunted by filter capacitor 146 (0.002 microfarad) to the end that unidirectional voltages of negative polarity appear across rectifier load resistance 127 and are applied to grid 125 of output tube 124 to render it less conductive when increasing light is applied to phototube 25. The anode of rectifier 140 is connected directly to grid 125.

The anodes of the two output tubes are connected in opposition to the end terminals of the single winding 148 of the galvanometer electromagnetic means 30 or motor which drives the vanes. This galvanometer winding is shunted by the series combination of a non-linear impedance 149 (3 watt, 120 volt lamp) and an iron core choke 150 (Jefferson 4819.J) for a purpose described in Engelmann II. The output tubes are both type 12BK5, for example, and their anodes are connected to supply terminal 60 through rheostats 151 and 152, respectively (each 10,000 ohms maximum).

Because the direction finder axis is more generally pointed toward oncoming cars by the steering mechanism, the optical field of the direction finder per se is proportioned to discriminate against undesired point sources of light without unduly restricting the size of such field.

While there has been shown and described what is considered to be the preferred embodiment of the present invention, it will be understood by those skilled in the

I claim:

1. An automatic headlighting system, for a vehicle having a steering system, comprising a headlight, a direction finder having an angularly movable mechanical output member for automatically sensing the relative bearing of the headlamp of an opposing vehicle, angularly movable means mechanically coupled to and ganged with said output member for substantially blanking out a portion of the beam of light from said headlight to cast a protective non-glare shadow in the zone of said vehicle, and means controlled by the steering system for turning the direction finder.

2. An automatic headlighting system in accordance with claim 1 in which said mechanical output member is an azimuthally positioned vane, and in which the angularly movable means includes a common shaft and a second vane in the headlamp, said second vane being mechanically coupled to and synchronized with the first-mentioned vane.

3. An automatic headlighting system for installation in a vehicle having steering means comprising a direction finder for sensing the relative bearing of the headlamp of an opposing vehicle, said direction finder including a supporting framework, a headlight, means in the headlight and synchronized with the direction finder for casting a protective non-glare shadow in the zone of said vehicle, and means for turning the supporting framework in coordination with said steering means.

4. An automatic headlighting system in accordance with claim 3, in which the last-mentioned means includes terminal lost-motion means permitting free play of the steering means relative to the framework-turning means.

5. An automatic headlighting system for installation in a vehicle having steering means comprising: a direction finder for sensing the relative bearing of the headlamp of an opposing vehicle, said direction finder including an optical device which defines a field of vision and has a supporting framework, a headlight mounted on said framework, means synchronized with the direction finder for casting a protective non-glare shadow in the zone of said vehicle, and means for turning the supporting framework in coordination with said steering means.

6. An automatic headlighting system for installation in a vehicle having steering means comprising a direction finder having a mechanical output member for sensing the relative bearing of the headlamp of an opposing vehicle, a headlight, means mechanically coupled to said output member for blanking out a portion of the beam of light from said headlight to cast a protective non-glare shadow in the zone of said vehicle, and means for turning the headlight and direction finder in coordination with said steering means.

7. An automatic headlighting system in accordance with claim 6 in which said output member is a shaft which positions in azimuth a vane and in which the means mechanically coupled to such output member is a similar vane in the headlight which is carried by said shaft and positioned in azimuth in synchronism with the direction finder vane.

8. An automatic headlighting system in accordance with claim 7, in which the means for turning the headlight and direction finder in coordination with the steering means includes lost-motion means permitting movement of the steering means after arresting of the turning of the headlight and direction finder.

9. An automatic headlighting system in accordance with claim 8 in which the means for turning the headlight and direction finder includes means permitting limited play of the steering means before the headlight and direction finder are turned.

10. An automatic headlighting system for a vehicle having a steering system comprising a headlight, a direction finder having an angularly movable mechanical output member for automatically sensing the relative bearing of the headlamp of an opposing vehicle, angularly movable means mechanically coupled to said output member for substantially blanking out a portion of the beam of light from said headlight to cast a protective non-glare shadow in the zone of said vehicle, a common shaft for ganging the last-mentioned means with said output member, and means controlled by the steering system for turning the direction finder.

11. An automatic headlighting system for installation in a vehicle having steering means comprising a direction finder including an angularly positioned vane for sensing the relative bearing of the headlamp of an opposing vehicle, a headlight including a supporting framework and a vane synchronized with the direction finder vane for casting a protective non-glare shadow in the zone of said vehicle, means for turning the supporting framework in coordination with said steering means, and a common shaft to which both of the vanes are secured for synchronizing their angular positions.

References Cited in the file of this patent

UNITED STATES PATENTS

| | | |
|---|---|---|
| 2,753,487 | Bone | July 3, 1956 |
| 2,876,384 | Brown | Mar. 3, 1959 |